United States Patent Office 2,800,511
Patented July 23, 1957

2,800,511

SUBSTITUTED TETRAHYDRONAPHTHALENE ALDEHYDES

Marion S. Carpenter, Nutley, William M. Easter, Jr., Hasbrouck Heights, and Thomas F. Wood, Little Falls, N. J., assignors to The Givaudan Corporation, New York, N. Y., a corporation of New Jersey No Drawing. Application January 28, 1955,
Serial No. 484,835

9 Claims. (Cl. 260—599)

This invention relates to novel chemical compounds, and more especially to substituted tetrahydronaphthalene aldehydes having musk-like odors.

Most of the known synthetic musk-like compounds fall into two classes: (1) nitrated aromatic hydrocarbons, such as musk xylene, and (2) macrocyclic ketones, lactones or esters, such as cyclopentadecanone, cyclopentadecanolide and ethylene brassylate. While members in the first group are inexpensive to manufacture, they suffer from the disadvantage that they are not light-stable or alkali-stable, frequently causing discoloration in products such as soap. Members of the second group, while reasonably stable to light and alkalies, are difficult to manufacture and are relatively costly.

We have found that certain novel chemical compounds which we have synthesized have the desirable property of being musk-like in olfactory character and yet are extremely stable to light and alkalies, and, at the same time, are inexpensive to manufacture and hence not relatively costly.

Our novel chemical compounds are lower alkyl-substituted, formyl - 1,1,4,4 - tetramethyl-1,2,3,4-tetrahydronaphthalenes. They are soluble in benzene, ethyl alcohol, ethylene dichloride and similar solvents. All possess musk-like odors per se or in solution and all are light-stable and alkali-stable.

In general, our novel musk-like compounds are prepared in three steps:

(1) Condensation of 2,5-dichloro 2,5-dimethyl hexane with a lower alkyl-substituted benzene in the presence of a suitable condensing agent such as aluminum chloride or ferric chloride to produce a 6-alkyl 1,1,4,4-tetramethyl 1,2,3,4-tetrahydronaphthalene;

(2) Treatment of the product of the first step with formaldehyde and hydrochloric acid to produce the corresponding 7-chloromethyl derivative, and (3) Treatment of the product of the second step with hexamethylenetetramine to convert the chloromethyl group to the corresponding formyl (or aldehyde) group. These reactions may be illustrated graphically by the following equations:

(1) 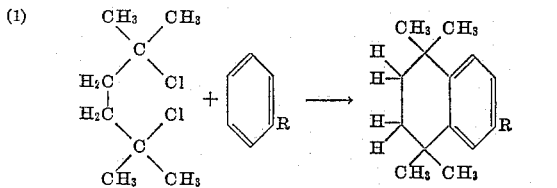

(2) 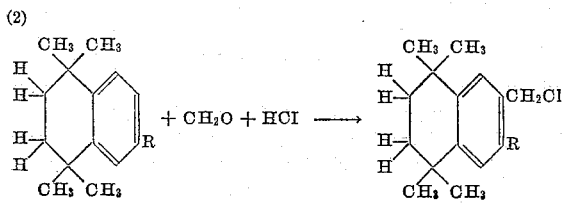

(3) 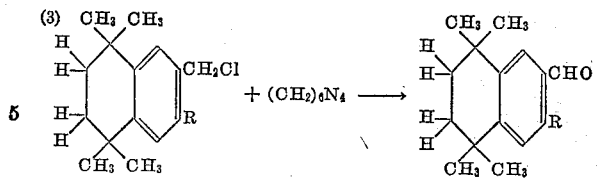

in which R represents a lower alkyl group.

Examples of specific compounds we have prepared include 7-formyl 1,1,4,4,6-pentamethyl 1,2,3,4-tetrahydronaphthalene, 7-formyl 1,1,4,4-tetramethyl 6-ethyl 1,2,3,4-tetrahydronaphthalene and 7-formyl 1,1,4,4-tetramethyl 6-isopropyl 1,2,3,4-tetrahydronaphthalene.

The following examples are given in order more fully to illustrate this invention, without, however, limiting the same to them.

EXAMPLE 1

*Preparation of 7-formyl 1,1,4,4,6-pentamethyl 1,2,3,4-tetrahydronaphthalene*

A mixture of 275 grams of toluene and 10 grams of aluminum chloride was cooled to 20° C. and to it was added a solution of 183 grams of 2,5-dichloro 2,5-dimethylhexane in 185 grams of toluene during 45 minutes, keeping the temperature at 20–25° C. and agitating continuously. After the evolution of hydrogen chloride had ceased the solution was quenched in water, washed to neutrality and distilled. There was obtained, in addition to the excess of toluene, 197 g. of a colorless practically odorless oil boiling at 78° C./1.5 mm. Hg and melting at 29° C., which is 1,1,4,4,6-pentamethyl 1,2,3,4-tetrahydronaphthalene.

A mixture of 202 grams of 1,1,4,4,6-pentamethyl 1,2,3,4-tetrahydronaphthalene, 20 grams of paraformaldehyde and 140 grams of 31% hydrochloric acid was agitated vigorously and warmed to 53° C. Then 250 grams of 93% sulfuric acid was added during 4 hours, maintaining vigorous agitation and gradually increasing the temperature to 65° C. Agitation was continued 8 hours further while the temperature was gradually increased to 72° C. After cooling and settling the lower acid layer was discarded, the upper oily layer was diluted with an equal volume of benzene and washed with 200 grams of water. The benzene solution was dried over anhydrous soda ash, filtered and distilled in the presence of 2 grams of anhydrous soda ash, first at atmospheric pressure to remove the solvent and finally in vacuo. There was collected, in addition to 75 grams of recovered 1,1,4,4,6-pentamethyl 1,2,3,4-tetrahydronaphthalene, 104 grams of 7-chloromethyl 1,1,4,4,6-pentamethyl 1,2,3,4-tetrahydronaphthalene as a colorless oil boiling at 131° C./2.5 mm. Hg which rapidly solidified. After crystallization from half its weight of naphtha, 93 grams was obtained in the form of colorless, odorless crystals melting at 89–90.5° C.

A mixture of 124 grams of 7-chloromethyl 1,1,4,4,6-pentamethyl 1,2,3,4-tetrahydronaphthalene, 70 grams of hexamethylenetetramine and 43 grams of water was refluxed with vigorous agitation for 3 hours at a temperature of 118–119° C. The viscous mixture was then steam-distilled by passing through it a current of superheated steam until the inside temperature had reached about 155° C., at which point all volatile material had been driven over. The crystalline portion of the distillate was separated from the aqueous portion and dissolved in benzene. The benzene solution was washed with 5% sulfuric acid to remove amines, then with water to neutrality and the solvent was evaporated off, leaving 63 g. of crude crystalline material. After crystallization from alcohol there was obtained 47 grams of 7-formyl 1,1,4,4,6-pentamethyl 1,2,3,4-tetrahydronaphthalene as colorless crystals having a strong, musk-like odor and melting, in a capillary tube at 85–91° C. This wide range in melting point is indicative, not of an impure product but rather of a product having a double melting point. Freezing point analysis showed the crystals to be 99+% pure and to have a freezing point of 92° C. The semicarbazone melted at 213.5–214.5° C., then resolidified and finally melted at 275° C. The oxime melted at 151.5–153° C. The crystalline aldehyde exhibits a phototropic effect, that is, the originally colorless crystals rapidly become yellow upon exposure to light. Upon storing in the dark or upon melting, the color disappears. Upon dissolving the yellow crystals in any colorless solvent, the yellow color disappears and the solution remains colorless after long exposure to sunlight. Thus the product may be said to be light-stable insofar as concerns its use as an ingredient of a perfume composition.

EXAMPLE 2

*Preparation of 7-formyl 1,1,4,4-tetramethyl 6-ethyl 1,2,3,4-tetrahydronaphthalene*

A mixture of 93 grams of ethylbenzene and 2 grams of anhydrous ferric chloride was cooled to −5° C. and to it was added a solution of 61 grams of 2,5-dichloro 2,5-dimethylhexane in 83 grams of ethylbenzene during 30 minutes, maintaining the temperature at −5° C. and agitating continuously. After the evolution of hydrogen chloride had ceased the solution was quenched in water, washed to neutrality and distilled to yield, in addition to the excess of ethylbenzene, 69 grams of a colorless oil boiling at 90° C./1.5 mm. Hg and having Sp. Gr. (25° C.) 0.920, $n_D^{20}$ 1.5165, which is 1,1,4,4-tetramethyl 6-ethyl 1,2,3,4-tetrahydronaphthalene.

A mixture of 800 grams of 1,1,4,4-tetramethyl 6-ethyl 1,2,3,4-tetrahydronaphthalene, 71 grams of paraformaldehyde and 495 grams of 31% hydrochloric acid was agitated vigorously and warmed to 64° C. Then 995 grams of 93% sulfuric acid was added during 8 hours, maintaining vigorous agitation and gradually increasing the temperature to 67° C. Agitation was continued 16 hours further while the temperature was gradually increased to 72° C. After cooling and settling, the lower acid layer was discarded and the upper oily layer was dried over anhydrous soda ash, filtered and distilled in vacuo in the presence of 5 grams of anhydrous soda ash. There was collected, in addition to 433 grams of recovered 1,1,4,4-tetramethyl 6-ethyl 1,2,3,4-tetrahydronaphthalene, 379 grams of 7-chloromethyl 1,1,4,4-tetramethyl 6-ethyl 1,2,3,4-tetrahydronaphthalene as a colorless oil boiling at 130° C./2 mm. Hg which rapidly solidified. After crystallization from half its weight of naphtha, 340 grams was obtained in the form of colorless, odorless crystals melting at 64.5–66° C.

A mixture of 396 grams of 7-chloromethyl 1,1,4,4-tetramethyl 6-ethyl 1,2,3,4-tetrahydronaphthalene, 210 grams of hexamethylenetetramine and 129 grams of water was refluxed with vigorous agitation for 4½ hours at a temperature of 116–124° C. The viscous mixture was then steam-distilled as in Example 1, carrying the inside temperature finally to 170° C. The oily portion of the distillate was washed as in Example 1 and distilled in vacuo to produce 170 grams of 7-formyl 1,1,4,4-tetramethyl 6-ethyl 1,2,3,4-tetrahydronaphthalene as a colorless oil having a strong, musk-like odor, boiling at 139° C./3 mm. Hg, congealing at 28° C. and melting at 31° C. The semicarbazone melted at 193.5–195° C. In the solid form the material turned yellow upon exposure to light, but in the liquid form, or in solution it remained colorless. Thus, as in the case of the lower homologue described in Example 1, it may be said to be light-stable insofar as concerns its use as an ingredient of a perfume composition.

EXAMPLE 3

*Preparation of 7-formyl 1,1,4,4-tetramethyl 6-isopropyl 1,2,3,4-tetrahydronaphthalene*

A mixture of 200 grams of cumene and 10 grams of anhydrous ferric chloride was cooled to 10° C. and to it was added a solution of 366 grams of 2,5-dichloro 2,5-dimethylhexane in 520 grams of cumene during 1 hour, keeping the temperature at 10–15° C. and agitating continuously. After the evolution of hydrogen chloride had ceased the solution was quenched in water, washed to neutrality and distilled to yield, in addition to 408 grams of recovered cumene, 392 grams of a colorless, practically odorless oil boiling at 94–95° C./1 mm. Hg which congealed upon cooling and melted at 28° C., and which is 1,1,4,4-tetramethyl 6-isopropyl 1,2,3,4-tetrahydronaphthalene.

A mixture of 477 grams of 1,1,4,4-tetramethyl 6-isopropyl 1,2,3,4-tetrahydronaphthalene, 41 grams of paraformaldehyde and 290 grams of 31% hydrochloric acid was agitated vigorously and warmed to 85° C. Then 580 grams of 93% sulfuric acid was added during 7 hours, maintaining vigorous agitation and gradually increasing the temperature to 90° C. Agitation was continued 17 hours further at 90° C. After cooling and settling, the lower acid layer was discarded and the upper oil layer was dried over anhydrous soda ash, filtered and distilled in vacuo in the presence of 4 grams of anhydrous soda ash. There was collected, in addition to 384 grams of recovered 1,1,4,4-tetramethyl 6-isopropyl 1,2,3,4-tetrahydronaphthalene, 76 grams of 7-chloromethyl 1,1,4,4-tetramethyl 6-isopropyl 1,2,3,4-tetrahydronaphthalene as a colorless oil boiling at 135° C./3.5 mm. Hg which rapidly solidified and had a melting point of 65–67° C.

A mixture of 109 grams of 7-chloromethyl 1,1,4,4-tetramethyl 6-isopropyl 1,2,3,4-tetrahydronaphthalene, 55 grams of hexamethylenetetramine and 33 grams of water was refluxed with vigorous agitation for 5 hours at a temperature of 118–132° C. The viscous mixture was then steam distilled as in Example 1, carrying the inside temperature finally to 170° C. The oily portion of the distillate was washed as in Example 1 and distilled in vacuo to produce 41 grams of 7-formyl 1,1,4,4-tetramethyl 6-isopropyl 1,2,3,4-tetrahydronaphthalene as a colorless oil having a musk-like odor somewhat weaker than those of the products prepared in Examples 1 and 2, and boiling at 135° C./2 mm. Hg. The oil congealed upon standing and after crystallization from alcohol yielded 36 grams of colorless crystals melting at 61.5–63° C. The crystals did not become yellow upon exposure to light, as did those of Examples 1 and 2. The semicarbazone melted at 179–180° C.

It will be readily apparent that our novel musk-like compounds can be employed in widely-varying formulations, depending upon the type of formulation, the odor effect desired, the desires of the compounder of the formulation, etc. Consequently, we do not wish to confine ourselves to any particular formulation, but wish it to be understood that our products can be employed as musks in perfume-containing formulations in general. By the term "perfume-containing" we include, inter alia, perfumes, cosmetics, soaps.

Each of the musk materials made in accordance with this invention exhibits a desirable musk odor of high order of persistence and not only has a marked ability to "fix" the odor of perfume compositions containing it, but also exhibits a subtle power to enhance the odor of such compositions, even when used in very small amounts. In this connection, each of the foregoing compounds made in accordance with Examples 1 to 3, inclusive, exhibited a desirable and persistent musk odor when incorporated in ethyl alcohol to make a 5% by weight solution. Soap cakes made by incorporating 0.1 percent by weight of each of the compounds of Examples 1 to 3, inclusive, to white milled soap retained their sweet, musk-like odors after exposure to light and air for 2 days, without discoloration. Rose and Muguet compositions containing a small quantity (1% of a 5% alcohol solution by weight of total composition) of the compounds of Examples 1 to 3, inclusive, were made and found to possess increased floweriness, realism and smoothness, as well as materially enhanced odor persistence.

The term "formaldehyde" in the claims includes products, such as paraformaldehyde, which yield formaldehyde during the reaction.

The foregoing illustrates the practice of this invention which, however, is to be construed as broadly as permissible in view of the prior art and limited solely by the appended claims.

We claim:
1. 6 - lower - alkyl - substituted, 7 - formyl - 1,1,4,4 - tetramethyl-1,2,3,4-tetrahydronaphthalenes.
2. 7 - formyl - 1,1,4,4,6 - pentamethyl - 1,2,3,4 - tetrahydronaphthalenes.
3. 7 - formyl - 1,1,4,4 - tetramethyl - 6 - ethyl - 1,2,3,4 - tetrahydronaphthalene.
4. 7 - formyl - 1,1,4,4 - tetramethyl - 6 - isopropyl - 1,2,3,4 - tetrahydronaphthalene.
5. The process for preparing 6-lower-alkyl-substituted, 7 - formyl - 1,1,4,4 - tetramethyl - 1,2,3,4 - tetrahydronaphthalenes, which comprises condensing 2,5-dihalo-2,5-dimethyl hexane with a lower-alkyl-substituted benzene in the presence of a condensing agent, halomethylating the resulting condensation product, and finally converting the halomethyl group of the resulting compound into a CHO group.
6. The process for preparing 6 - lower - alkyl - substituted, 7-formyl-1,1,4,4-tetramethyl-1,2,3,4-tetrahydronaphthalenes, which comprises condensing 2,5-dichloro-2,5-dimethyl hexane with a lower-alkyl-substituted benzene in the presence of a condensing agent, reacting the resulting condensation product with formaldehyde and hydrochloric acid to yield the corresponding chloromethyl derivative, and finally converting the chloromethyl group of the resulting compound into a CHO group by treatment of the chloromethyl derivative with hexamethylene tetramine.
7. The process for preparing 7-formyl-1,1,4,4,6-pentamethyl-1,2,3,4-tetrahydronaphthalene, which comprises condensing 2,5-dichloro-2,5-dimethyl hexane with toluene in the presence of a condensing agent, reacting the resulting condensation product with formaldehyde and hydrochloric acid to yield the corresponding chloromethyl derivative, and finally converting the chloromethyl group of the resulting compound into a CHO group by treatment of the chloromethyl derivative with hexamethylene tetramine.
8. The process for preparing 7-formyl-1,1,4,4-tetramethyl-6-ethyl-1,2,3,4-tetrahydronaphthalene, which comprises condensing 2,5-dichloro-2,5-dimethyl hexane with ethyl benzene in the presence of a condensing agent, reacting the resulting condensation product with formaldehyde and hydrochloric acid to yield the corresponding chloromethyl derivative, and finally converting the chloromethyl group of the resulting compound into a CHO group by treatment of the chloromethyl derivative with hexamethylene tetramine.
9. The process for preparing 7-formyl-1,1,4,4-tetramethyl - 6 - isopropyl - 1,2,3,4 - tetrahydronaphthalene, which comprises condensing 2,5-dichloro-2,5-dimethyl hexane with cumene in the presence of a condensing agent, reacting the resulting condensation product with formaldehyde and hydrochloric acid to yield the corresponding chloromethyl derivative, and finally converting the chloromethyl group of the resulting compound into a CHO group by treatment of the chloromethyl derivative with hexamethylene tetramine.

References Cited in the file of this patent

UNITED STATES PATENTS 2,628,256    Campbell et al. _____ Feb. 10, 1953

FOREIGN PATENTS 452,537    France _____ Mar. 8, 1913

OTHER REFERENCES

Brunson et al.; Jour. Am. Chem. Soc., vol. 62, pp. 37–44 (1940).

Hoffman-La Roche, 42 Chem. Abst., 7339 (1948).